(12) United States Patent
Halbritter

(10) Patent No.: US 9,834,386 B2
(45) Date of Patent: Dec. 5, 2017

(54) DOSING APPARATUS

(71) Applicant: BIG DUTCHMAN INTERNATIONAL GMBH, Vechta (DE)

(72) Inventor: Lars Halbritter, Lohne (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 77 days.

(21) Appl. No.: 14/851,209

(22) Filed: Sep. 11, 2015

(65) Prior Publication Data
US 2016/0075520 A1  Mar. 17, 2016

(30) Foreign Application Priority Data

Sep. 12, 2014 (DE) .................. 20 2014 007 282 U

(51) Int. Cl.
| | | |
|---|---|---|
| B65G 43/08 | (2006.01) |
| B65G 43/00 | (2006.01) |
| B65G 39/00 | (2006.01) |
| B65G 47/74 | (2006.01) |
| C05F 3/06 | (2006.01) |
| F26B 11/00 | (2006.01) |
| G01G 11/00 | (2006.01) |
| F16B 15/06 | (2006.01) |
| F26B 9/08 | (2006.01) |

(Continued)

(52) U.S. Cl.
CPC ............... *B65G 43/08* (2013.01); *C05F 3/06* (2013.01); *F16B 15/06* (2013.01); *F26B 9/085* (2013.01); *F26B 11/00* (2013.01); *F26B 15/18* (2013.01); *F26B 25/002* (2013.01); *G01G 11/003* (2013.01); *Y02P 20/145* (2015.11)

(58) Field of Classification Search
None
See application file for complete search history.

(56) References Cited

U.S. PATENT DOCUMENTS

| 503,664 A | 8/1893 | Jones |
|---|---|---|
| 2,074,383 A | 3/1937 | Funk |
| 2,149,686 A | 3/1939 | Rivenburgh |

(Continued)

FOREIGN PATENT DOCUMENTS

| AU | 1715083 | 8/1982 |
|---|---|---|
| CH | 485 202 | 1/1970 |

(Continued)

*Primary Examiner* — Kavel Singh
(74) *Attorney, Agent, or Firm* — Price Heneveld LLP

(57) ABSTRACT

The present invention relates to a dosing apparatus for dosing a good, in particular a good to be dried such as a fermentation substrate or dung, comprising a conveyor for conveying a good to be dried in a conveying direction, wherein the good to be dried may be fed onto the conveyor by a feeding system and wherein the conveyor may deliver the good to be dried to a downstream unit such as a drying apparatus, and a control unit designed to control a conveying speed of the conveyor, wherein the conveyor is pivotally arranged about a vertical swivel axis, characterized in that the control unit is arranged and designed to control an oscillating movement, preferably a speed, in particular an angular speed, and/or a frequency of the oscillating movement, of the conveyor about the swivel axis.

25 Claims, 10 Drawing Sheets

(51) Int. Cl.
   *F26B 15/18* (2006.01)
   *F26B 25/00* (2006.01)

(56) References Cited

U.S. PATENT DOCUMENTS

| | | | |
|---|---|---|---|
| 2,808,029 A | 10/1957 | Geerlings | |
| 2,842,096 A | 7/1958 | Bradfield | |
| 2,884,899 A | 5/1959 | Jackes et al. | |
| 2,969,867 A | 1/1961 | McClelland | |
| 3,102,511 A | 9/1963 | Atcheson | |
| 3,139,065 A | 6/1964 | Willauer, Jr. | |
| 3,145,793 A | 8/1964 | Ray | |
| 3,215,252 A | 11/1965 | Wilkes | |
| 3,388,690 A | 6/1968 | Hostetler | |
| 3,427,929 A | 2/1969 | Dawson | |
| 3,511,215 A | 5/1970 | Myers | |
| 3,696,584 A | 10/1972 | Rickard | |
| 3,722,743 A | 3/1973 | Atchley | |
| 3,738,077 A | 6/1973 | Leach | |
| 3,759,368 A | 9/1973 | Rose et al. | |
| 3,770,107 A | 11/1973 | Michelbach | |
| 3,811,412 A | 5/1974 | Murto et al. | |
| 3,898,435 A | 8/1975 | Pritchard et al. | |
| 3,911,868 A | 10/1975 | Brembeck | |
| 3,966,049 A | 6/1976 | van den Berg | |
| 3,968,904 A * | 7/1976 | Neville | A24C 5/397 222/25 |
| 3,997,388 A * | 12/1976 | Simon | F26B 3/343 159/47.1 |
| 4,070,990 A | 1/1978 | Swartzendruber | |
| 4,086,998 A | 5/1978 | van der Schoot | |
| RE29,944 E | 3/1979 | Hyer et al. | |
| 4,159,696 A | 7/1979 | Martin | |
| 4,199,051 A | 4/1980 | Kimberley | |
| 4,216,742 A | 8/1980 | Kirchhofer | |
| 4,226,211 A | 10/1980 | Barrentine | |
| 4,253,120 A | 2/1981 | Levine | |
| 4,345,682 A | 8/1982 | White et al. | |
| 4,348,988 A | 9/1982 | Lawson | |
| 4,401,057 A | 8/1983 | Van Gilst | |
| 4,416,218 A | 11/1983 | Holz | |
| 4,418,773 A | 12/1983 | Finet et al. | |
| 4,476,811 A | 10/1984 | Swartzendruber | |
| 4,527,513 A | 7/1985 | Hart et al. | |
| 4,542,808 A | 9/1985 | Lloyd, Jr. et al. | |
| 4,552,095 A | 11/1985 | Segalla | |
| 4,575,993 A | 3/1986 | Meyn | |
| 4,603,657 A | 8/1986 | Peckskamp | |
| 4,675,520 A | 6/1987 | Harrsen et al. | |
| 4,676,197 A | 6/1987 | Hoover | |
| 4,846,337 A | 7/1989 | Kuhlmann | |
| 4,863,009 A | 9/1989 | Winkel et al. | |
| 4,868,901 A | 9/1989 | Kniskern et al. | |
| 4,959,040 A | 9/1990 | Gardner | |
| 4,995,343 A | 2/1991 | Cole et al. | |
| 5,007,380 A | 4/1991 | Badia et al. | |
| 5,046,570 A | 9/1991 | Emme et al. | |
| 5,092,274 A | 3/1992 | Cole et al. | |
| 5,097,797 A | 3/1992 | Van Zee et al. | |
| 5,101,765 A | 4/1992 | Manfrin | |
| 5,101,766 A | 4/1992 | Runion | |
| 5,113,797 A | 5/1992 | van Daele | |
| 5,119,893 A | 6/1992 | Jost | |
| 5,165,514 A | 11/1992 | Faulkner | |
| 5,222,589 A | 6/1993 | Gordon | |
| 5,232,080 A | 8/1993 | van Essen et al. | |
| 5,275,131 A | 1/1994 | Brake et al. | |
| 5,304,745 A | 4/1994 | Rusk et al. | |
| 5,311,839 A | 5/1994 | Pollock et al. | |
| 5,311,977 A | 5/1994 | Dean et al. | |
| 5,365,717 A | 11/1994 | McKinlay | |
| 5,406,907 A | 4/1995 | Hart | |
| 5,435,267 A | 7/1995 | Patterson | |
| 5,462,017 A | 10/1995 | Pollock et al. | |
| 5,490,591 A | 2/1996 | Faulkner | |
| 5,497,730 A | 3/1996 | van Daele et al. | |
| 5,551,822 A | 9/1996 | Pippin et al. | |
| 5,603,285 A | 2/1997 | Kleinsasser | |
| 5,642,688 A | 7/1997 | Bannier et al. | |
| 5,718,187 A | 2/1998 | Pollock et al. | |
| 5,736,682 A | 4/1998 | Heitmann et al. | |
| 5,762,021 A | 6/1998 | Horwood et al. | |
| 5,765,503 A | 6/1998 | van Daele | |
| 5,778,821 A | 7/1998 | Horwood et al. | |
| 5,794,562 A | 8/1998 | Hart | |
| 5,875,733 A | 3/1999 | Chen | |
| 5,884,581 A | 3/1999 | Vandaele | |
| 5,927,232 A | 7/1999 | Pollock | |
| 5,941,193 A | 8/1999 | Cole | |
| 5,957,083 A | 9/1999 | Cheng | |
| 5,964,185 A | 10/1999 | DeBonne et al. | |
| 5,967,083 A | 10/1999 | Kleinsasser | |
| 6,050,220 A | 4/2000 | Kimmel et al. | |
| 6,056,109 A * | 5/2000 | Hidai | B65G 43/08 198/431 |
| 6,066,809 A | 5/2000 | Campbell et al. | |
| 6,152,078 A | 11/2000 | Romeu Guardia | |
| 6,173,676 B1 | 1/2001 | Cole | |
| 6,211,470 B1 | 4/2001 | Beran et al. | |
| 6,223,552 B1 | 5/2001 | Zimmerbauer | |
| 6,317,656 B1 | 11/2001 | Kira | |
| 6,382,404 B1 | 5/2002 | Guldenfels | |
| 6,383,068 B1 | 5/2002 | Tollett et al. | |
| 6,394,031 B1 | 5/2002 | Moller | |
| 6,401,936 B1 | 6/2002 | Isaacs et al. | |
| 6,407,523 B1 | 6/2002 | Allan | |
| 6,412,439 B1 | 7/2002 | Otto-Lubker | |
| 6,470,826 B2 | 10/2002 | Thuline | |
| 6,484,886 B1 | 11/2002 | Isaacs et al. | |
| 6,539,893 B1 | 4/2003 | Otto-Lubker | |
| 6,625,960 B1 | 9/2003 | Nambu | |
| 6,655,317 B1 | 12/2003 | Steudler, Jr. et al. | |
| 6,732,851 B2 | 5/2004 | Wienken | |
| 6,779,488 B2 | 8/2004 | Corti et al. | |
| 7,191,895 B2 | 3/2007 | Zeitler | |
| 7,228,817 B2 | 6/2007 | Busse | |
| 7,279,645 B1 * | 10/2007 | Inglin | G01G 11/046 177/145 |
| 7,552,697 B2 | 6/2009 | Busse | |
| 7,573,567 B2 | 8/2009 | Hershtik | |
| 7,878,391 B2 | 2/2011 | Kalkhoff | |
| 8,127,916 B2 | 3/2012 | Mix | |
| 8,168,897 B2 | 5/2012 | Sudkamp | |
| 8,360,230 B2 | 1/2013 | Rompe | |
| 8,590,695 B2 | 11/2013 | Moreno Rueda | |
| 2002/0152965 A1 | 10/2002 | Turner et al. | |
| 2003/0192774 A1 | 10/2003 | Cotter et al. | |
| 2004/0112713 A1 | 6/2004 | Haan et al. | |
| 2005/0063513 A1 | 3/2005 | Hsieh et al. | |
| 2005/0150747 A1 | 7/2005 | Menendez | |
| 2005/0217967 A1 | 10/2005 | Scott | |
| 2006/0039583 A1 | 2/2006 | Bickert et al. | |
| 2008/0251357 A1 | 10/2008 | Kawakami | |
| 2009/0020395 A1 | 1/2009 | Accettura | |
| 2009/0045029 A1 | 2/2009 | Deur | |
| 2010/0294624 A1 | 11/2010 | Warner | |
| 2011/0062000 A1 | 3/2011 | Yamamoto | |
| 2012/0160637 A1 | 6/2012 | Itoh et al. | |
| 2012/0181150 A1 | 7/2012 | Damm | |
| 2013/0014704 A1 | 1/2013 | Kuking | |
| 2013/0092512 A1 | 4/2013 | Buschmann et al. | |
| 2013/0206549 A1 | 8/2013 | Clevers et al. | |
| 2013/0299317 A1 | 11/2013 | Moller | |

FOREIGN PATENT DOCUMENTS

| | | |
|---|---|---|
| CN | 201834531 | 5/2011 |
| DE | 5 25 996 | 6/1931 |
| DE | 1 820 785 | 8/1960 |
| DE | 1 124 872 | 3/1962 |
| DE | 1 406 150 | 3/1969 |
| DE | 7 102 326 | 9/1971 |
| DE | 2 155 120 | 5/1972 |
| DE | 2 157 774 | 5/1974 |

(56) References Cited

FOREIGN PATENT DOCUMENTS

| | | |
|---|---|---|
| DE | 2 313 663 | 10/1974 |
| DE | 2 350 555 | 4/1975 |
| DE | 118 839 | 3/1976 |
| DE | 2 612 594 | 9/1977 |
| DE | 2 802 542 | 7/1979 |
| DE | 3 138 748 | 4/1983 |
| DE | 3 326 706 | 2/1984 |
| DE | 3 332 240 | 3/1985 |
| DE | 34 19 883 | 11/1985 |
| DE | 3 445 429 | 6/1986 |
| DE | 3 525 460 | 2/1987 |
| DE | 3 607 858 | 9/1987 |
| DE | 4 036 112 | 4/1994 |
| DE | 43 13 456 | 5/1994 |
| DE | 43 05 559 | 8/1994 |
| DE | 4 411 776 | 10/1995 |
| DE | 195 46 626 | 6/1997 |
| DE | 196 07 258 | 8/1997 |
| DE | 197 07 155 | 8/1997 |
| DE | 198 51 793 | 11/1998 |
| DE | 198 07 231 | 9/1999 |
| DE | 299 12 821 | 11/1999 |
| DE | 199 06 916 | 8/2000 |
| DE | 101 06 206 | 8/2002 |
| DE | 101 64 100 | 4/2003 |
| DE | 101 64 122 | 5/2003 |
| DE | 203 15 118 | 2/2004 |
| DE | 102 48 875 | 4/2004 |
| DE | 102 55 072 | 6/2004 |
| DE | 699 24 866 | 3/2006 |
| DE | 2006 003 445 | 8/2007 |
| DE | 2006 004 894 | 8/2007 |
| DE | 20 2007 008 362 | 9/2007 |
| DE | 20 2007 009 477 | 9/2007 |
| DE | 20 2006 007 875 | 10/2007 |
| DE | 20 2008 003 498 | 10/2008 |
| DE | 10 2009 055 952 | 6/2011 |
| DE | 20 2010 016 688 | 5/2012 |
| DE | 20 2012 004 330 | 7/2012 |
| DE | 20 2012 004 008 | 8/2012 |
| DE | 10 2012 003987 | 8/2013 |
| DE | 20 2012 010 170 | 3/2014 |
| DE | 20 2012 010 693 | 3/2014 |
| DE | 20 2012 010 694 | 3/2014 |
| DE | 20 2013 001 238 | 7/2014 |
| DE | 20 2013 010 980 | 4/2015 |
| DE | 20 2015 102 303 | 7/2015 |
| EA | 2010 70867 | 2/2011 |
| EP | 0 287 874 | 10/1988 |
| EP | 0 105 571 | 6/1989 |
| EP | 0 387 242 | 9/1990 |
| EP | 0 414 487 | 2/1991 |
| EP | 0 421 553 | 4/1991 |
| EP | 0 718 218 A2 | 6/1996 |
| EP | 0 891 704 | 1/1999 |
| EP | 0 892 254 A1 | 1/1999 |
| EP | 1 077 026 | 2/2001 |
| EP | 1 145 631 | 10/2001 |
| EP | 1 306 326 | 5/2003 |
| EP | 0 892 254 B1 | 9/2003 |
| EP | 1 570 732 | 9/2005 |
| EP | 1 856 971 | 5/2007 |
| EP | 2 134 164 | 9/2008 |
| EP | 1 671 901 | 12/2008 |
| EP | 2 003 412 | 12/2008 |
| EP | 2 045 198 A1 | 4/2009 |
| EP | 2 377 787 A1 | 10/2011 |
| EP | 2 850 927 | 3/2015 |
| ES | 2449667 | 3/2014 |
| FR | 1129736 | 1/1957 |
| FR | 2030824 | 11/1970 |
| FR | 2322809 | 4/1977 |
| FR | 2483652 | 12/1981 |
| FR | 2780247 | 12/1999 |
| GB | 856296 | 12/1960 |
| GB | 1 021 571 | 3/1966 |
| GB | 1 022 509 | 3/1966 |
| GB | 1 237 284 | 8/1967 |
| GB | 1 406 164 | 4/1973 |
| GB | 2 047 649 | 12/1980 |
| GB | 2 080 663 | 2/1982 |
| GB | 2 086 593 | 5/1982 |
| GB | 2 125 756 | 8/1982 |
| GB | 2 226 130 | 6/1990 |
| JP | S 5889508 | 5/1983 |
| JP | 11079345 | 3/1999 |
| JP | 11139526 | 5/1999 |
| JP | 2000-235005 | 8/2000 |
| JP | 2001-27612 | 1/2001 |
| JP | 2001-287710 | 10/2001 |
| JP | 2003-346124 | 12/2003 |
| JP | 2007-175027 | 12/2007 |
| NL | 8002232 | 11/1981 |
| NL | 9400025 | 8/1995 |
| NL | 1037320 | 9/2009 |
| RU | 2129303 | 4/1999 |
| SU | 1483470 | 5/1989 |
| WO | 9743733 | 11/1997 |
| WO | 2004004319 | 1/2004 |
| WO | 2005 109111 A1 | 11/2005 |
| WO | 2009 092130 A1 | 7/2009 |
| WO | 2011136644 | 11/2011 |
| WO | 2012045622 | 4/2012 |

\* cited by examiner

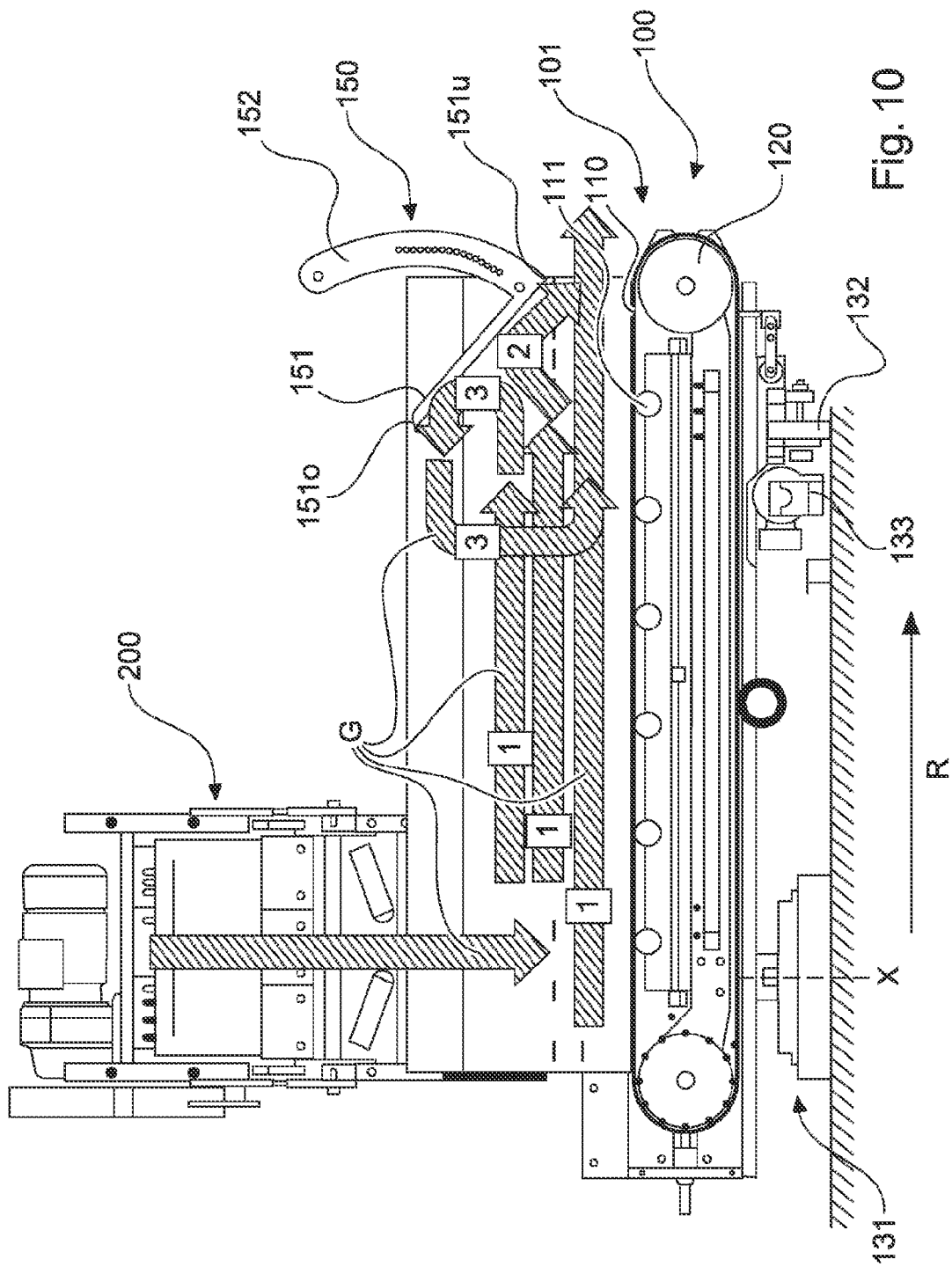

DOSING APPARATUS

CROSS-REFERENCE TO FOREIGN PRIORITY APPLICATION

The present application claims the benefit under 35 U.S.C. §119(b) of German Application No. DE 202014007282.5, filed Sep. 12, 2014, entitled "Dosing Apparatus."

FIELD OF THE INVENTION

The present invention relates to a dosing apparatus for dosing a good, in particular a good to be dried such as a fermentation substrate or dung, comprising a conveyor for conveying a good to be dried in a conveying direction, wherein the good to be dried may be fed onto the conveyor by a feeding system and wherein the conveyor may deliver the good to be dried to a downstream unit such as a drying apparatus, and a control unit designed to control a conveying speed of the conveyor.

The present invention further relates to a method for dosing a good, in particular a good to be dried, such as a fermentation substrate or dung, comprising conveying a good to be dried, which has been fed onto a conveyor, in a conveying direction and controlling a conveying speed of the conveyor.

BACKGROUND OF THE INVENTION

Dosing apparatuses and methods of the above type are known, for example, from DE 198 51 793 and DE 20 2008 003 498 U1 and are used, in particular, for drying fresh dung from layer houses or fermentation substrates from biogas plants. The drying of such goods is a prerequisite for storing and marketing such goods. Drying tunnels are preferably used for such drying, into which air such as the warm exhaust air from a layer house is fed through fans in a pressure corridor. Several layers of perforated drying belts are arranged above and next to the pressure corridor to allow the exhaust air to flow into the drying tunnel through lateral openings and through the perforations, thus dehydrating and drying the good. Drying can take place within a closed area if the air released by the drying tunnel is to be filtered. This allows for making the drying process largely odorless. A prerequisite for ideal drying is that the belts are loaded as evenly as possible with the good to be dried. To load the drying belts, the good to be dried is normally conveyed via infeed belts to a dosing apparatus which is mostly located at the top level of the drying tunnel. The good is released from the dosing apparatus onto the top drying belt and is then conveyed via the lower levels of the drying tunnel to show an as high as possible dry matter content once it leaves the drying tunnel. The dried good can then be transported further and stored without causing odor problems or, at the least, heavy odor problems.

To load, for example, a drying belt of a drying apparatus, the dosing apparatuses known from prior art have sections that in the presence of a specific mass value of the material located on the section stop the feeding or discharge of the good to thus allow for an even loading of the drying belt. Such dosing apparatuses and methods allow for adapting the dosing to various requirements and realizing a control that will preserve the drives of the conveyor belts. However, there is a need for further improved dosing apparatuses and methods.

One object of the present invention is, thus, to provide a dosing apparatus and method for dosing a good, in particular a good to be dried such as a fermentation substrate or dung, that will allow for improved and/or easier dosing. One particular object of the present invention is to provide a dosing apparatus and method for dosing a good, in particular a good to be dried such as a fermentation substrate or dung, that will allow for particularly even and/or exact dosing.

SUMMARY OF THE INVENTION

The present invention solves this problem by providing a dosing apparatus for dosing a good, in particular a good to be dried such as a fermentation substrate or dung, comprising a conveyor for conveying a good to be dried in a conveying direction, wherein the good to be dried may be fed onto the conveyor by a feeding system and wherein the conveyor may deliver the good to be dried to a downstream unit, such as a drying apparatus, and a control unit designed to control a conveying speed of the conveyor, wherein the conveyor is pivotally arranged about a vertical swivel axis, characterized in that the control unit is arranged and designed to control an oscillating movement, preferably a speed, in particular an angular speed, and/or a frequency of the oscillating movement, of the conveyor about the swivel axis.

The present invention is based, inter alia, on the finding that in order to achieve an as even as possible distribution of the good which is to be dried on a unit that is arranged down-stream of the dosing apparatus, such as a drying apparatus, it is advantageous to control not only the speed of the conveyor with a control unit but also a pivoting or oscillating movement of the conveyor about a vertical swivel axis.

The conveyor of the dosing apparatus may be designed, for example, as a belt conveyor having an endless conveyor belt, with the good to be dried being fed onto its upper run by a feeding system where the good to be dried can be delivered from the upper run to a down-stream unit, such as a conveyor belt of a drying apparatus, via one end located downstream of the conveying direction (also referred to as discharge end) by the movement of the upper run in the conveying direction.

Preferably, the conveyor has one or more drives allowing for the good that is to be dried to be conveyed in a conveying direction. If the conveying direction is designed as a conveyor belt having an endless conveyor belt, such drive may be, for example, a belt drive arranged, for example, in the shape of a deflection sheave at one end of the endless conveyor.

The control unit controls the conveying speed of the conveyor, i.e., the speed at which the good to be dried is moved in the conveying direction. The conveying speed of the conveyor can, thus, be used to indirectly control the amount of the good to be dried that is delivered onto the downstream unit.

According to the invention, the conveyor is pivotally arranged about a vertical swivel axis. It is preferred, in particular, for the discharge end of the conveyor via which the good to be dried may be delivered to the downstream unit to be pivotable about a vertical swivel axis that is preferably arranged in a section of the conveyor arranged at or close to the opposite end of the conveyor. Preferably, the vertical swivel axis is aligned orthogonally to a longitudinal axis of the conveyor in the conveying direction, preferably intersecting the longitudinal axis. It is particularly preferred for the vertical swivel axis to be arranged in such half, in particular, such third or fourth of the conveyor that is located at one end of the conveyor opposite to the discharge end of the conveyor.

The conveyor is pivotable about the vertical swivel axis preferably in a segment of about 90 degrees, preferably, and in particular, per about 45 degrees to either side based on a longitudinal axis of the conveyor in the conveying direction.

It is particularly preferred for a speed, in particular, an angular speed, and/or an oscillating frequency of the conveyor to be controlled when it oscillates about the swivel axis. An as even as possible distribution of the good, which is to be dried, on a unit that is located downstream of the dosing apparatus also depends, in particular, on the frequency and speed at which the conveyor performs its oscillating movement. A corresponding control may be thus applied in an advantageous manner to achieve an as exact and even as possible dosing.

One preferred embodiment provides for the control unit to be designed to control the oscillating movement, preferably a speed, in particular, an angular speed, and/or a frequency of the oscillating movement, of the conveyor about the swivel axis based on the conveying speed. Here, the control unit preferably links the control of the oscillating movement of the conveyor with the control of the conveying speed of the conveyor. Such linking can help further improve the dosing of the good to be dried that is delivered by the conveyor. It is particularly preferred for the speed, in particular, the angular speed, of the oscillating movement of the conveyor about the swivel axis to be controlled based on the conveying speed at which the conveyor conveys the good to be dried.

Alternatively, a control unit can be provided designed to control the oscillating movement, preferably a speed, in particular, an angular speed, and/or a frequency of the oscillating movement, of the conveyor about the swivel axis based on the feed speed of a feeding system.

Preferably, a control unit is provided and designed such as to change the speed, in particular, the angular speed, of the oscillating movement of the conveyor about the swivel axis along a path of motion of the conveyor. If the speed, in particular, the angular speed, of the oscillating movement of the conveyor along its path of motion is not steady but varies, this may be used to achieve a particularly even distribution of the good which is to be dried on a unit located downstream of the dosing apparatus. Therefore, the control unit is preferably designed to increase, maintain, or reduce the speed, in particular, the angular speed, of the oscillating movement of the conveyor about the swivel axis along the path of motion depending on the position of the conveyor.

According to another aspect of the invention, the above-mentioned object is solved by a dosing apparatus pursuant to the preamble of claim 1 or one of the previously described dosing apparatuses where the control unit is designed to control the conveying speed of the conveyor based on the oscillating movement, preferably the speed, in particular, the angular speed, and/or the frequency of the oscillating movement, of the conveyor about the swivel axis and/or to change the conveying speed of the conveyor along a path of motion of the conveyor.

This aspect is based, inter alia, on the finding that an as even as possible distribution of the good which is to be dried on a unit that is arranged downstream of the dosing apparatus, such as a drying apparatus, can be achieved also by controlling the conveying speed of the conveyor in a specific manner. Such specific controlling may consist of controlling the conveying speed of the conveyor based on the oscillating movement, in particular, based on the speed, in particular, the angular speed, and/or the frequency of the oscillating movement, of the conveyor about the swivel axis. However, such specific controlling may also consist of changing the conveying speed of the conveyor along a path of motion of the conveyor. If the conveying speed of the conveyor along its path of motion is not steady but varies, this may be used to achieve a particularly even distribution of the good which is to be dried on a unit located downstream of the dosing apparatus. Therefore, the control unit is preferably designed to increase, maintain, or reduce the conveying speed of the conveyor along the path of motion depending on the position of the conveyor.

What is particularly preferred is for the control unit to be designed to control the speed, in particular, the angular speed, of the oscillating movement of the conveyor such that the speed, in particular the angular speed, of the oscillating movement of the conveyor is greater in the area of the reversal points of a path of motion of the oscillating movement, preferably greater by a multiple, than between the reversal points, in particular, at one point halfway of the path of motion between the reversal points.

The reversal points are preferably the endpoints of the path of motion of the oscillating movement, i.e., the points where the conveyor changes its moving direction, i.e., where it comes to a brief halt after passing through a circular arc section and before starting to move again in the opposite direction. The path of motion is preferably arranged such that the point at halfway is the point on the longitudinal axis that extends in the conveying direction. Since the movement of the conveyor changes its direction at the reversal point of the oscillating movement, the speed of the conveyor must briefly drop to zero at the very reversal point, i.e., when the moving direction changes. Therefore, a greater speed in the area of the reversal points is to be understood to mean that the speed of the conveyor along the path of motion in the vicinity of the reversal points, i.e., shortly before or after the reversal points, is increased. Such area of the reversal points means, in particular, an area of approximately 10%, approximately 15%, approximately 20%, approximately 25%, or approximately 30% of the entire path of motion between the reversal points, with such area of approximately 10%, approximately 15%, approximately 20%, approximately 25%, or approximately 30% connecting to the reversal points directly at the ends of the path of motion.

The conveyor can be decelerated and/or the direction of the oscillating movement reversed, for example, by a mechanical stop at the reversal points. To this end, the dosing apparatus may, for example, show a sensor such as a roller sensor or roller lever on each side in the area of the discharge end, which will detect that the reversal point has been reached and which is preferably designed to then change the drive direction of a drive of the conveyor to achieve the oscillating movement, for example, via a reversing contactor control. Once the stop has been reached and the direction of the oscillating movement reversed, the conveyor's oscillating movement is again accelerated to target speed. When driving the conveyor to reach the oscillating movement by means of an electric motor, the time required to accelerate to target speed may depend on the ramp of the frequency converter and is preferably not more than 1 second and, in particular, not more than 0.5 seconds.

Here, an increased or target (angular) speed in the area of the reversal points is understood to mean, in particular, the (angular) speed which the conveyor has in its oscillating movement shortly before deceleration and/or after (re-)acceleration following the change in direction at the reversal point.

Such increase in speed, in particular, in angular speed, in the area of the reversal points prevents more good which is to be dried to accumulate at the sides of a downstream unit, in particular of a downstream conveyor belt, than between such sides. By decelerating the angular speed, the conveyor may deliver more good to be dried in the area of the path of motion at reduced speed, meaning that in the area between the two border areas of a downstream conveyor belt preferably the same amount of good to be dried may be delivered as in the border areas.

Furthermore, a particularly preferred embodiment of the dosing apparatus follows when designing the control unit such as to determine, especially through interpolation, the speed, in particular the angular speed, of the oscillating movement of the conveyor for the remaining path of motion based on speeds, in particular angular speeds, that have been indicated for specific points of the path of motion.

The preferred speeds, in particular angular speeds, of the oscillating movement of the conveyor at certain points of the path of motion or in certain areas of the path of motion, such as in the area of the reversal points and/or at a point half way of the path of motion between the reversal points, can be determined particularly well based on tests, i.e., empirically. Such speeds determined based on tests can be provided in the control unit preferably as default speeds in these areas or points of the path of motion. For example, for various goods to be dried or goods to be dried having different properties one might also provide several such—preferably empirically determined—default speeds. In that case, the control unit is preferably designed to determine the speed also for the other sections of the path of motion, and thus preferably the speeds or speed curve over the entire path of motion, based on such default speeds, preferably by applying the method of interpolation. What is further preferred in this case is for the control unit to control the oscillating movement of the conveyor over the entire path of motion based on the default and the determined speeds or determined speed curve.

Another embodiment of the dosing apparatus provides for the latter to comprise a weighing apparatus arranged and designed to determine the weight of the good to be dried that is located on the conveyor. The determination of the weight of the good to be dried that is located on the conveyor is an important parameter that allows for exactly controlling the dosing.

What is moreover preferred is for the conveyor to have a plurality of load cells. It is particularly preferred for the conveyor to have four load cells, wherein preferably two load cells each are arranged crosswise to the conveying direction spaced apart at a first and at a second end of the conveyor. An arrangement of a plurality of load cells, in particular, of four load cells, in the above-described arrangement is preferred in order to be able to determine as precisely as possible the weight of the good to be dried that is located on the conveyor. Having the conveyor mounted on four load cells that are preferably arranged in the area of the conveyor's four corners has the advantage that this way one can determine the weight of the good located on the conveyor irrespective of how it is distributed over the length of the conveyor. This way, one can, for example, reduce or even eliminate the impact that a shift in the center of mass of the good on the conveyor or the impact that uneven feeding by a feeder has on weight determination. For example, deferred feeding of the good to be dried onto the conveyor may result in an uneven distribution of the good to be dried. Also, the center of mass of the good located on the conveyor will moreover change as a result of conveying the good along the conveyor. Preferably, the weighing apparatus, in particular, the plurality of load cells, is thus arranged such as to minimize the impact that the position of the good on the conveyor has on the weighing result.

What is moreover preferably provided is for the control unit to be designed such as to control the conveying speed and/or the oscillating movement, preferably a speed, in particular, an angular speed, and/or a frequency of the oscillating movement, of the conveyor about the swivel axis based on the amount and/or weight of the good that is to be dried and that is located on the conveyor and/or based on the amount fed by a feeding system per time unit and/or based on the weight fed by a feeding system per time unit. Another aspect that may be preferred is a control based on a feeding speed such as a conveying speed of an inlet belt conveyor.

What is moreover particularly preferred is for the control unit to be designed such as to provide the default speeds with a weight-dependent offset based on the weight of the good that is to be dried and that is located on the conveyor and to consider such offset when determining the speed, in particular the angular speed, of the oscillating movement of the conveyor for the remaining path of motion. This way one can make weight-dependent changes to the oscillating movement of the conveyor to ensure an as even as possible dosing or discharge of the good even if the good to be dried is distributed unequally or unevenly on the conveyor.

What is furthermore preferred is an embodiment where the control unit is arranged and designed to receive one or more signals, preferably with information on one or more downstream units, such as on their conveying speed(s), and to control the conveying speed and/or the oscillating movement, preferably a speed, in particular, an angular speed, and/or a frequency of the oscillating movement, of the conveyor about the swivel axis based on the signal or signals received.

This embodiment provides for the control unit to be able to control the conveying speed and/or oscillating movement also based on one or more downstream units. With drying apparatuses for drying good such as fermentation substrate or dung, adjusting the conveying speeds of various drying apparatuses or drying belts to the amount and speed at which such good to be dried is fed into the drying apparatus is decisive for a good drying result. Therefore, it is advantageous if the dosing apparatus can also consider information, in particular, on process parameters such as the conveying speed of conveyor belts, of downstream units in order to be able to control the dosing apparatus such that the conveyor delivers such amount of good that is adjusted to the downstream units.

It is furthermore preferred for the control unit to be arranged and designed such as to generate one or more signals, preferably with information on the good to be delivered by the dosing apparatus, such as its amount, weight, the conveying speed at which the good is delivered, or other properties of the good, and to preferably send such signal(s) to one or more downstream units. This way, the dosing apparatus also allows for the control units of downstream units to control such downstream units based on one or more of the signals received by the control unit of the dosing apparatus and to, for example, adjust the conveying speeds of drying belts of drying apparatuses that are located downstream of the dosing apparatus to the type, amount, and speed of the good delivered by the dosing apparatus.

Another preferred embodiment of the dosing apparatus provides for the dosing apparatus to have two side walls that substantially extend parallel to the conveying direction and that are preferably and substantially aligned vertically, at least in sections, or that are tilted by less than 30 degrees, in particular by less than 10 degrees, to the vertical.

Providing two side walls has the advantage that the good located on the conveyor of the dosing apparatus can be held in place by the side walls, which prevents the good from falling off the sides of the conveyor in an uncontrolled manner. This way, it is delivered only at the intended location, preferably at the discharge end of the conveyor.

The design of the two side walls that are substantially vertical, at least in sections, or tilted by less than 30 degrees, in particular, by less than 10 degrees, to the vertical has the advantage that it allows for more precise weight determination.

What is moreover preferably provided is for the two side walls that substantially extend parallel to the conveying direction to each open by less than 5 degrees in conveying direction, in particular by 1 degree each. The good to be dried that is located on the conveyor is preferably delivered at the conveyor's discharge end located downstream in the conveying direction. It is, thus, advantageous for the two side walls to slightly open in the conveying direction, i.e., toward the conveyor's discharge end. This way, one can reduce or even prevent the good to be dried from accumulating at the conveyor's discharge end in conveying direction.

It is furthermore preferred for the dosing apparatus to have a control flap arranged substantially crosswise to the conveying direction, which is preferably affixed to the two side walls. The control flap is moreover preferably arranged in the area of the conveyor's end portion that is located downstream in the conveying direction, i.e., in the area of the conveyor's discharge end. Preferably, the control flap is detachably and/or movably affixed to the side walls.

It is furthermore preferred for the control flap to be pivotable about a horizontal adjusting axis and preferably fixable in various swivel positions. The control flap can be fixed in one or more different swivel positions by using, for example, a snap-on connection, a pin, or similar means.

What is moreover preferably provided is for the adjusting axis to be arranged such that a lower end of the control flap is pivotable about the adjusting axis so that the adjusting axis can assume one or more swivel positions in which the control flap is tilted from an upper end to a lower end in the conveying direction. Preferably, the tilt of the control flap from an upper end to a lower end in the conveying direction is approximately 30 to 60 degrees to the horizontal, for example, approximately 45 degrees to the horizontal.

It is furthermore preferred for the control flap to be designed and arranged such that a minimum distance between the control flap and the conveyor is not undercut and/or a maximum distance between the control flap and the conveyor is not exceeded.

The control flap and its possible embodiments have the advantage that a certain pressure can be applied on the good to be dried when or before being delivered by the dosing apparatus. At the same time, the tilted design of the control flap, in particular, has the advantage that it reduces or even prevents the good to be dried from banking up or jamming behind the control flap. This also promotes a continuous flow of the good.

According to yet another aspect of the invention, the object mentioned in the beginning is solved by a method for dosing a good, in particular a good to be dried such as fermentation substrate or dung, comprising conveying a good to be dried that is conveyed on a conveyor in a conveying direction, controlling a conveying speed of the conveyor, and controlling an oscillating movement, preferably a speed, in particular, an angular speed, and/or an oscillating frequency of the oscillating movement, of the conveyor about a vertical swivel axis of the conveyor.

The method according to the invention and its possible further developments show features and/or method steps that make them particularly suitable for use in a dosing apparatus according to the invention and its further developments.

As regards the advantages, embodiment variants, and embodiment details of the method according to the invention and its possible further developments, reference is made to the above description of the respective apparatus features.

BRIEF DESCRIPTION OF THE DRAWINGS

Preferred exemplary embodiments of the invention are described based on the enclosed Figures.

FIG. 10 is a longitudinal section of the dosing apparatus pursuant to FIG. 1 with a diagramed depiction of the good's flow.

DETAILED DESCRIPTION OF THE PREFERRED EMBODIMENTS

Figure 1:
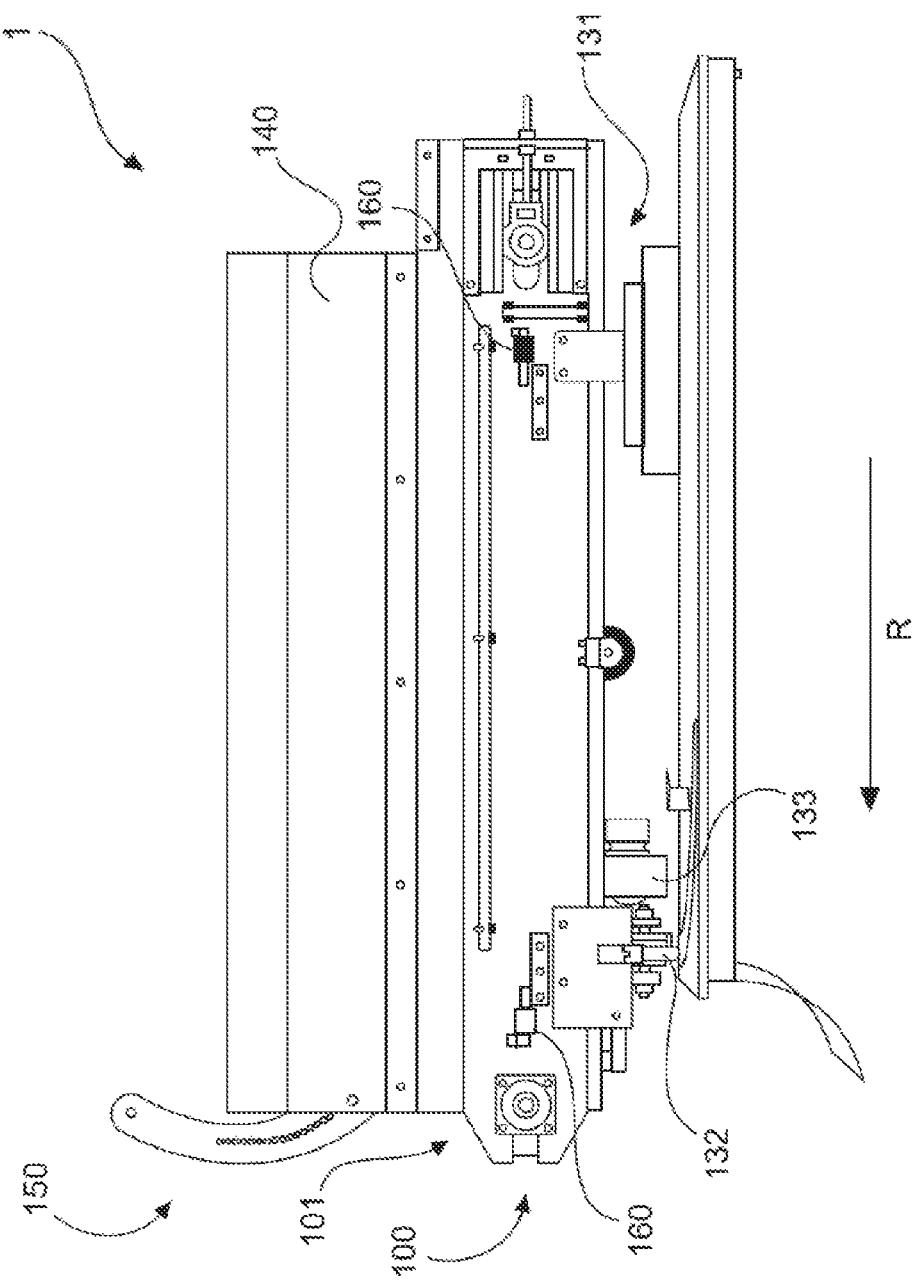
FIG. 1 is a lateral view of an exemplary embodiment of a dosing apparatus according to the invention (rotated 180 degrees in relation to the other drawings)

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The dosing apparatus shown in FIGS. 1 to 10 and its properties show an exemplary design of a possible dosing apparatus according to the invention. The lateral view in FIG. 1 is rotated 180 degrees in relation to the other drawings. Equal elements or elements with substantially the same function have been given the same reference numbers in the drawings.

The shown exemplary dosing apparatus 1 for dosing a good G, in particular a good to be dried such as a fermentation substrate or dung, has a conveyor 100 for conveying the good G to be dried in a conveying direction R. As can be seen in particular from FIGS. 5 to 7 and 10, the good G to be dried may be fed into the dosing apparatus 1, in particular, onto the conveyor 100, by a feeding system 200. The dosing apparatus 1 or the conveyor 100 deliver the good, for example, to a downstream unit that may be designed, for example, like a drying apparatus, via an end 101 of the conveyor 100, which may be also referred to as discharge end and which is located downstream of the conveying direction R.

Conveyor 100 is designed as a conveyor belt with an endless belt that is located on several rolls 111 and deflected via two deflection sheaves 120, with preferably at least one of the deflection sheaves 120 being designed as a driven roll or belt drive to drive the upper run 110, on which the good is conveyed, in conveying direction R. The system is preferably driven by an electric motor. The conveying speed of the conveyor 100 can be controlled with a control unit (not shown), in particular by changing the drive speed of the belt drive.

The dosing apparatus 1 has two side walls 140 that substantially extend parallel to the conveying direction R. As can be seen in particular from FIGS. 2 and 8, the two walls extending substantially parallel to the conveying direction R open slightly in the conveying direction R, namely each by 1 degree as can be seen in the examples shown in FIGS. 2 and 9. Numeral I in FIG. 9 is an example of how the side walls 140 would run if they did not open slightly in the conveying direction R. Said slight opening of the side walls 140 has the advantage that it reduces or even prevents the good G to be conveyed from jamming or banking up towards the discharge end 101.

Figure 8A:
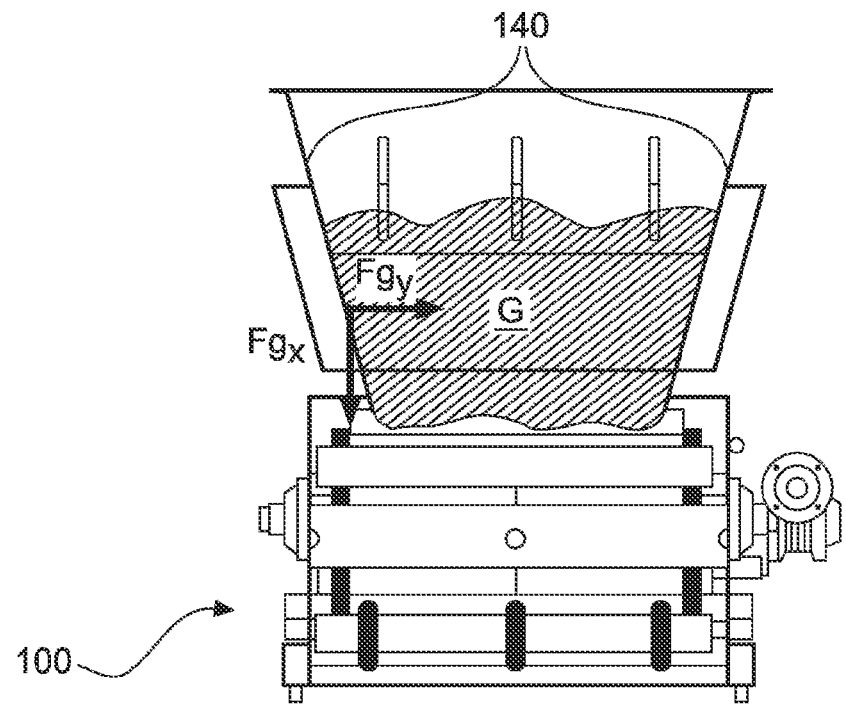
FIG. 8a is a cross section of one part of a dosing apparatus with a first configuration of side walls.
Figure 8B:
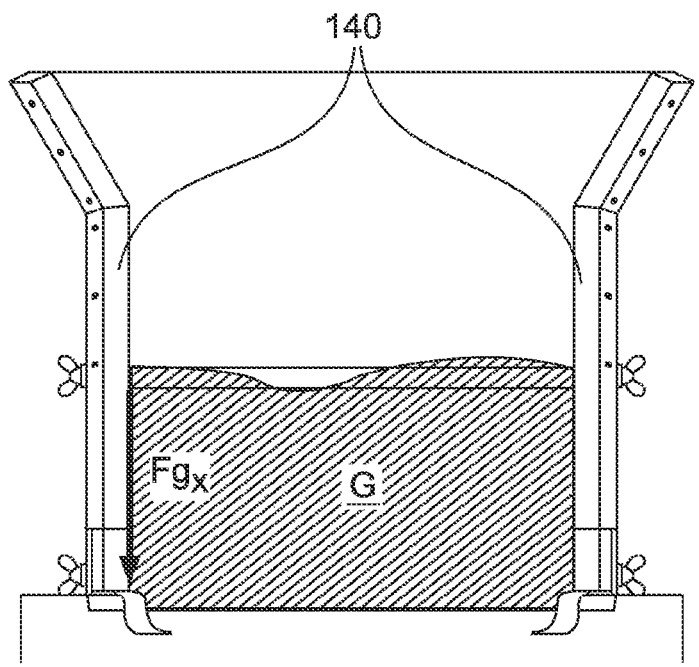
FIG. 8b is a cross section of one part of a dosing apparatus with a second configuration of side walls.
Figure 9:
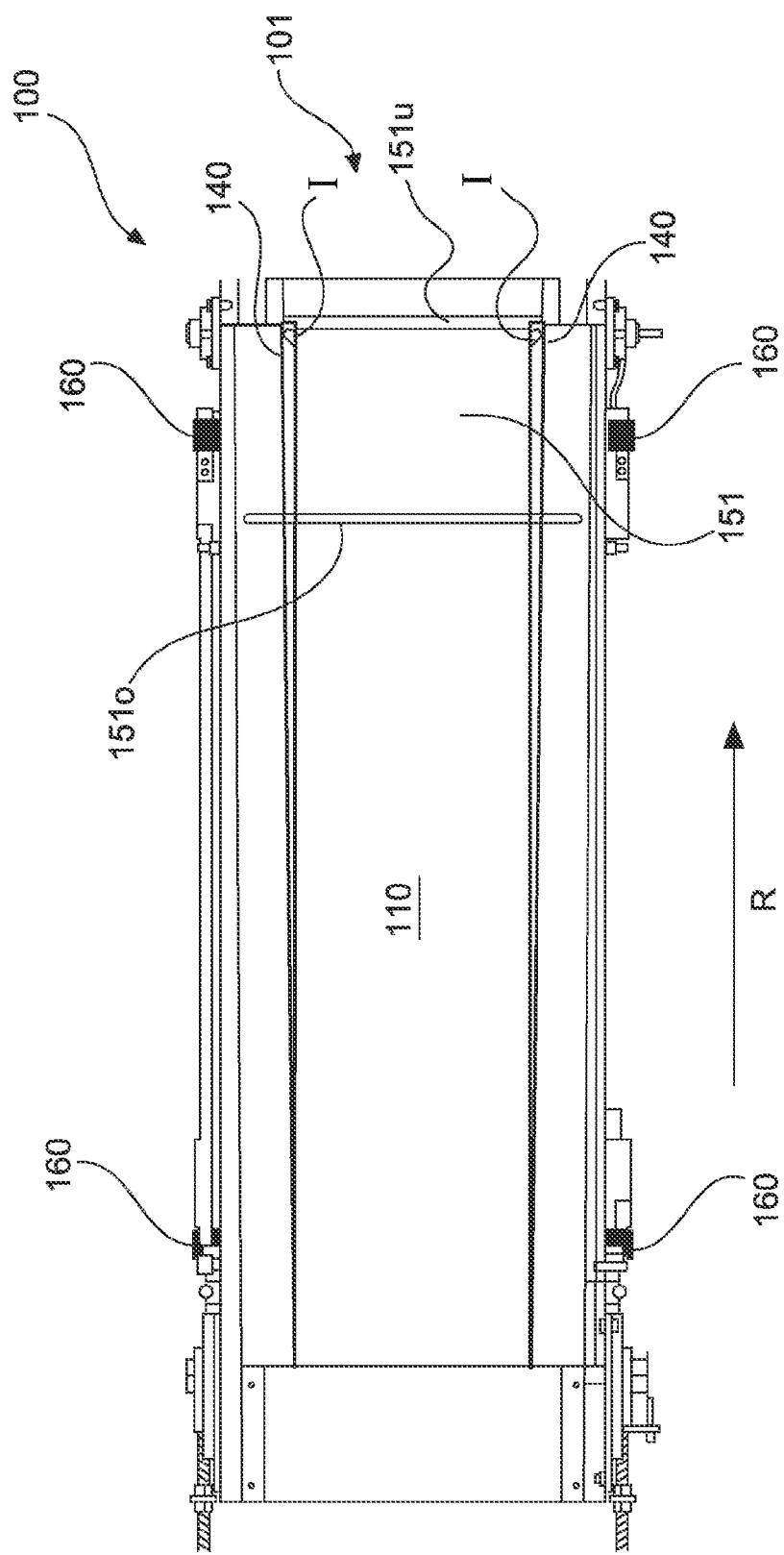
FIG. 9 is another top view of one part of a dosing apparatus pursuant to FIG. 1.

FIGS. 8a and 8b show a cross section of two different designs of the side walls 140', 140. In FIG. 8a, the side walls 140' are tilted to the vertical, wherein in FIG. 8b the side walls 140 are aligned vertically, at least in sections, namely in the lower section. The variant shown in FIG. 8b has the advantage that weight determination of the good G located in the conveying direction 100 between the side walls 140 is improved.

To determine the weight of the good G to be dried that is located in the conveying direction 100, the dosing apparatus 1 is equipped with a weighing apparatus in form of four load cells 160, with two load cells 160 each arranged at the discharge end 101 of the conveyor 100 and disposed crosswise to the conveying direction R and two further load cells 160 arranged at an end of the conveyor 100 opposite to the discharge end 101 and also disposed crosswise to the conveying direction R.

Figure 5:
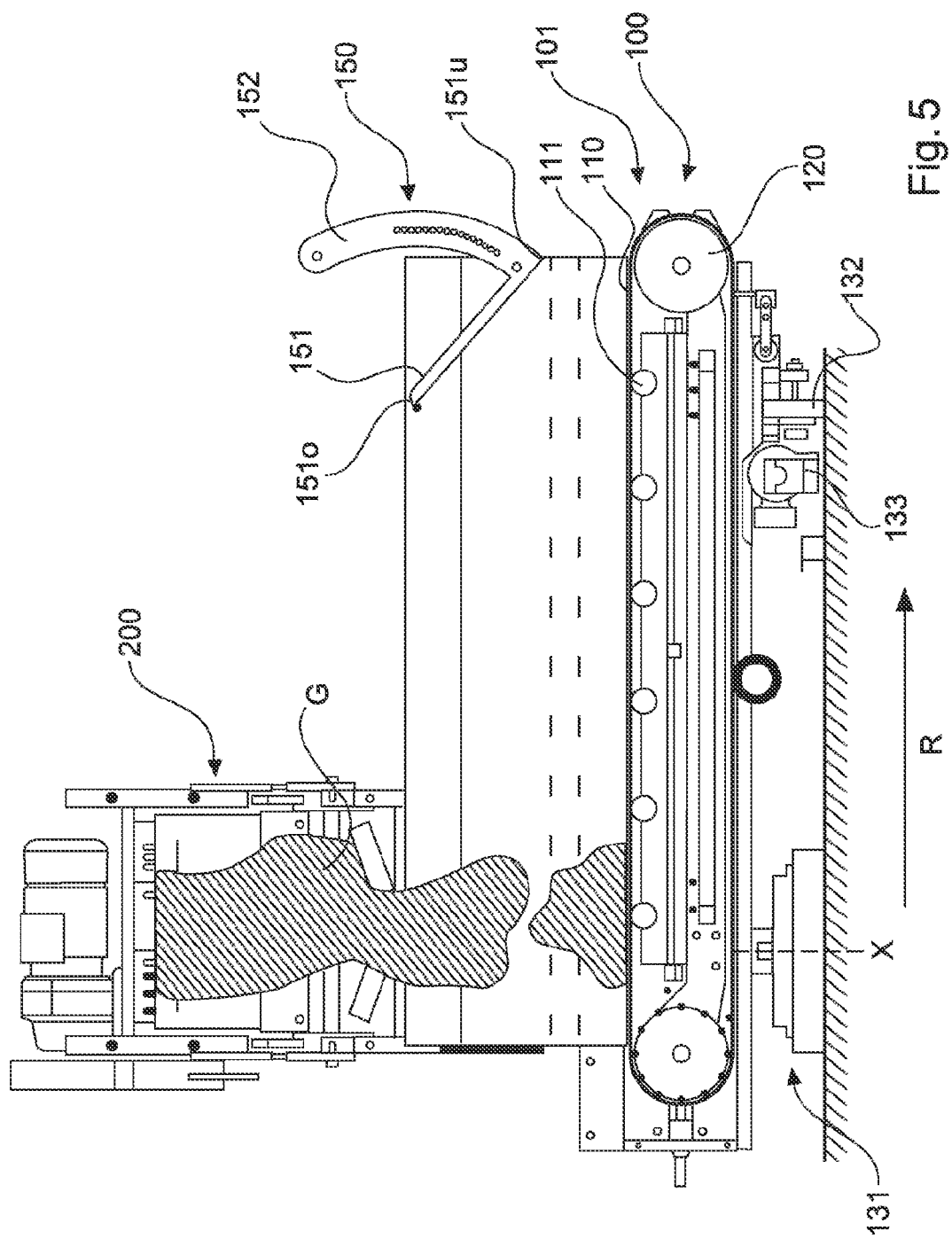
FIG. 5 is a longitudinal section of the dosing apparatus pursuant to FIG. 1 at a first stage.
Figure 6:
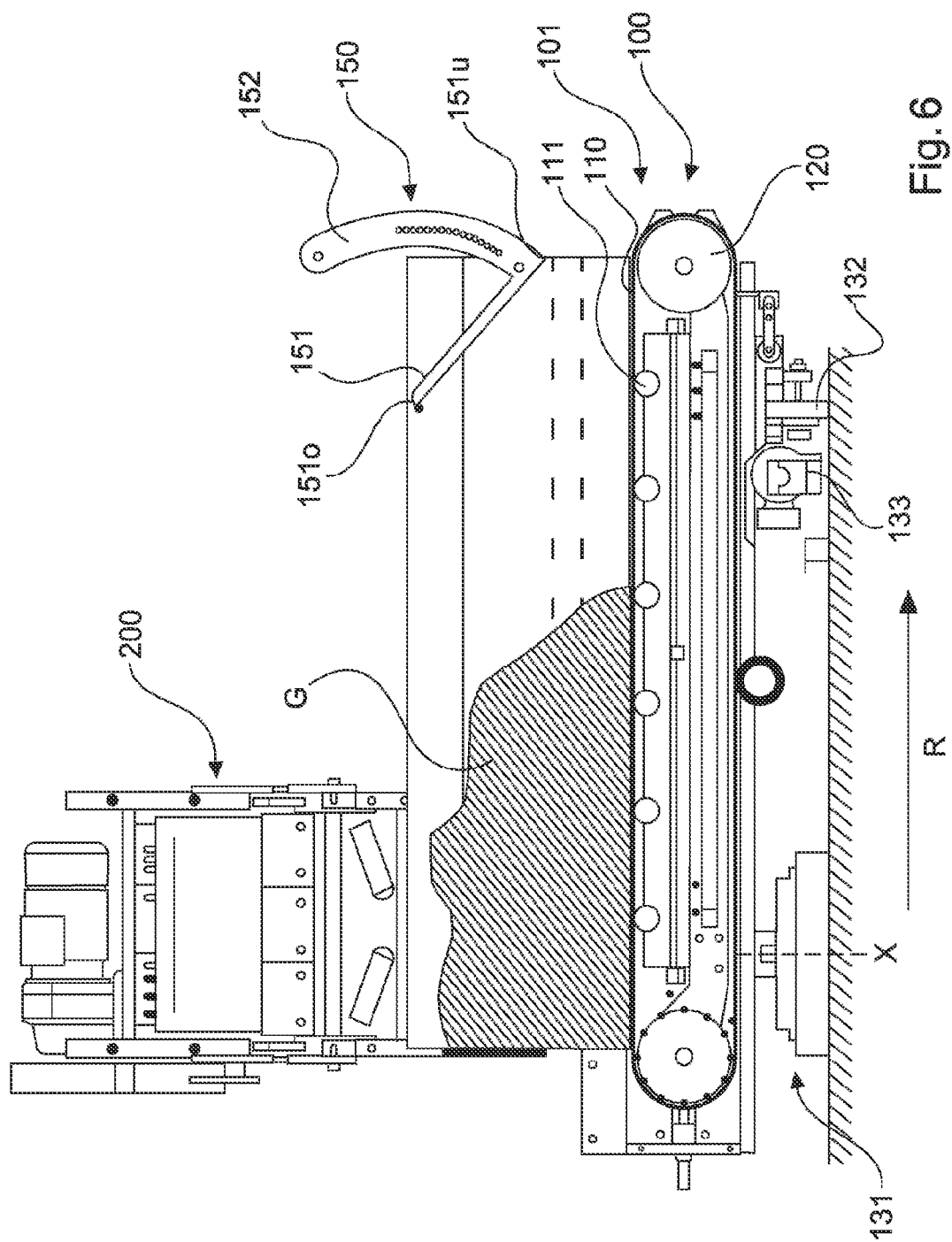
FIG. 6 is a longitudinal section of the dosing apparatus pursuant to FIG. 1 at a second stage.
Figure 7:
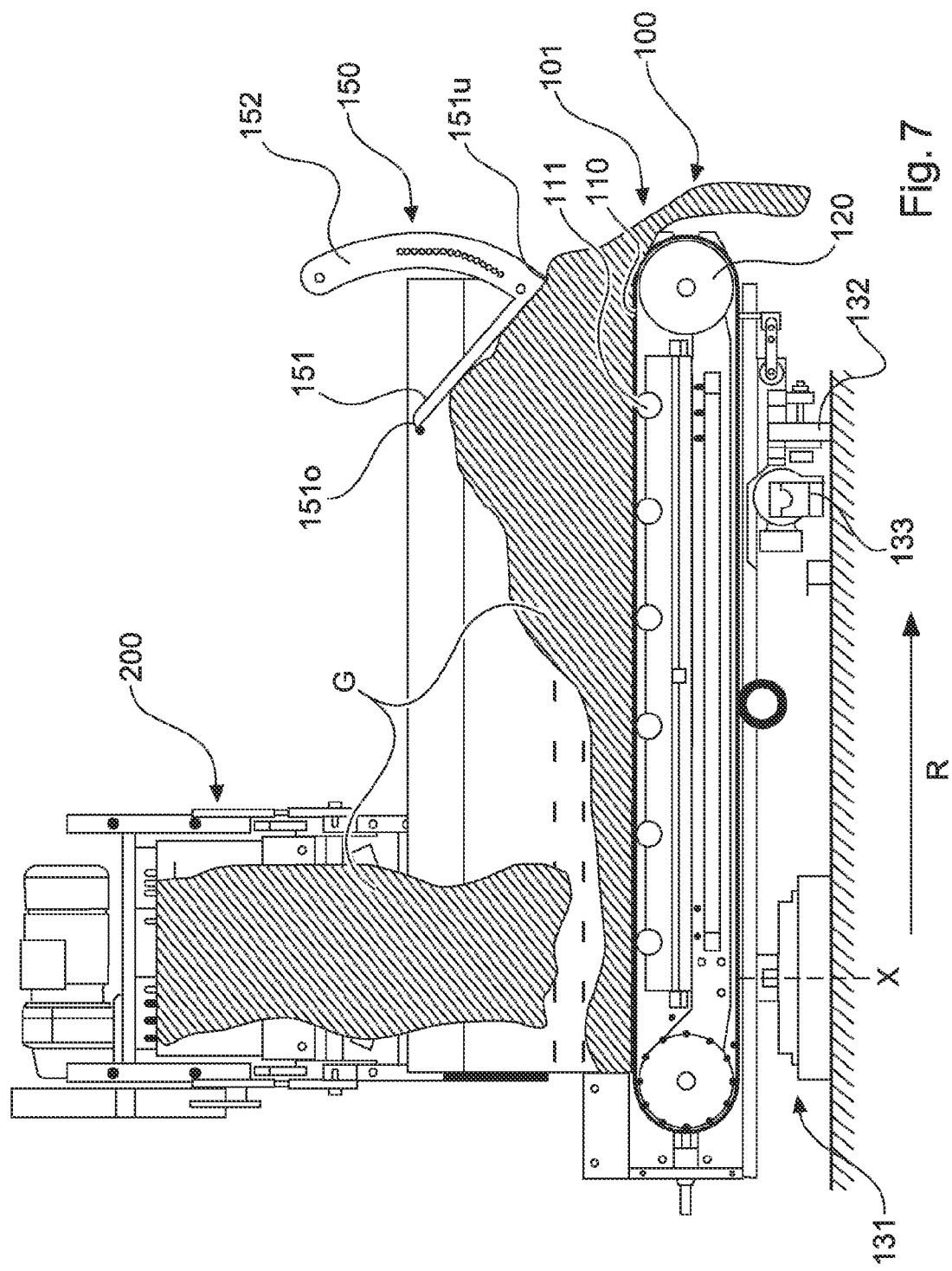
FIG. 7 is a longitudinal section of the dosing apparatus pursuant to FIG. 1 at a third stage.

This arrangement of several load cells 160 has the advantage that the weight of the good G to be dried that is located in the conveying direction 100 can be determined in a reliable manner even if the good G is distributed unevenly and/or varyingly on the conveyor 100, as shown, for example, in FIGS. 5 to 7: In FIG. 5, good G is fed onto the upper run 110 of the conveyor 100 by feeding system 200. In FIG. 6, the good G is then located on a section of the upper run 110 of the conveyor 100 that is substantially located upstream of the conveying direction R and is then conveyed further in the conveying direction R, as shown in FIG. 7, to a section of the upper run 110 of the conveyor 100 that is located downstream of the conveying direction R. A new feeding of good G via the feeding system 200 will again change the center of mass of the good G located on the conveyor 100. Providing several load cells has the advantage that the weight of the good G on the upper run 110 of the conveyor 100 can be determined in a reliable manner, irrespective of how the good G is distributed on the upper run 110 of the conveyor 100.

The conveyor 100 is pivotally arranged about a vertical swivel axis X. The vertical swivel axis X is aligned orthogonally to the longitudinal axis Y of the conveyor 100 and intersects the longitudinal axis. The vertical swivel axis X is furthermore arranged in such area of the conveyor 100 that approximately corresponds to one fourth of the extension of the conveyor 100 in the conveying direction R based on an end that lies opposite to the discharge end 101. This way, the oscillating movement of the conveyor 100 facilitates, in particular, an oscillating movement of the discharge end 101 of the conveyor 100 along a path of motion, which corresponds to a 90 degree circular arc section—as can be seen, in particular, in FIG. 2.

The pivotable mounting about the swivel axis X is realized by means of a corresponding mounting device 131. The oscillating movement of the discharge end 101 is supported by a roll 132 that is preferably driven by an electric motor 133.

The control unit is arranged and designed to control the oscillating movement of the conveyor 100, wherein, for example, the drive 133 for driving the wheel 132 can be used for control purposes. Preferably, the control unit is designed, in particular, such as to change the speed, in particular the angular speed, and/or the oscillating frequency of the oscillating movement of the conveyor 100 about the swivel axis X, for example based on the conveying speed of the conveyor 100, based on information, such as conveying speeds, of one or more downstream units, such as drying apparatuses, and/or based on the weight of the good G located on the conveyor 100. The frequency of the oscillating movement can also be controlled by the control unit.

Figure 2:
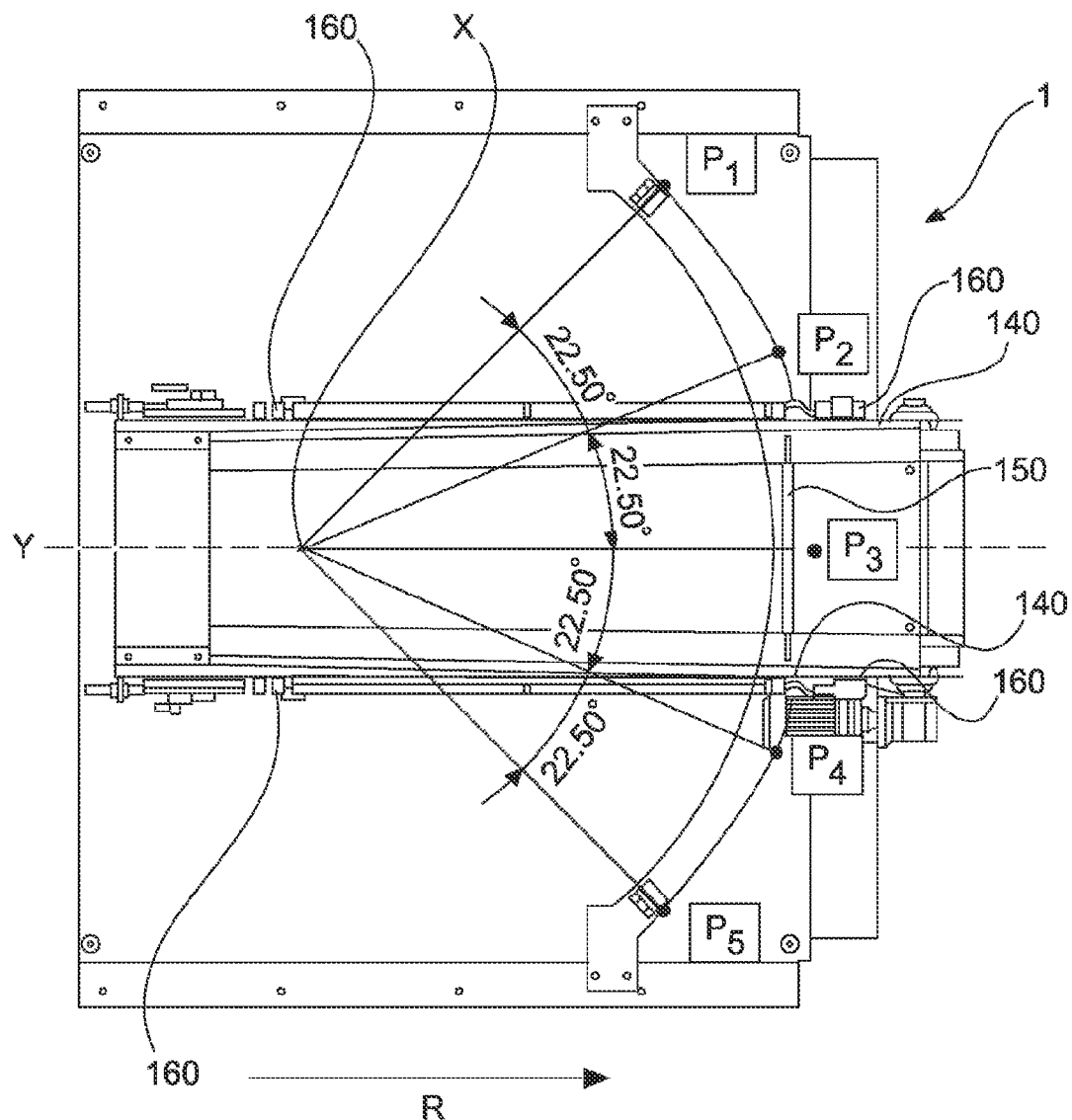
FIG. 2 is a top view of the dosing apparatus pursuant to FIG. 1.
Figure 3:
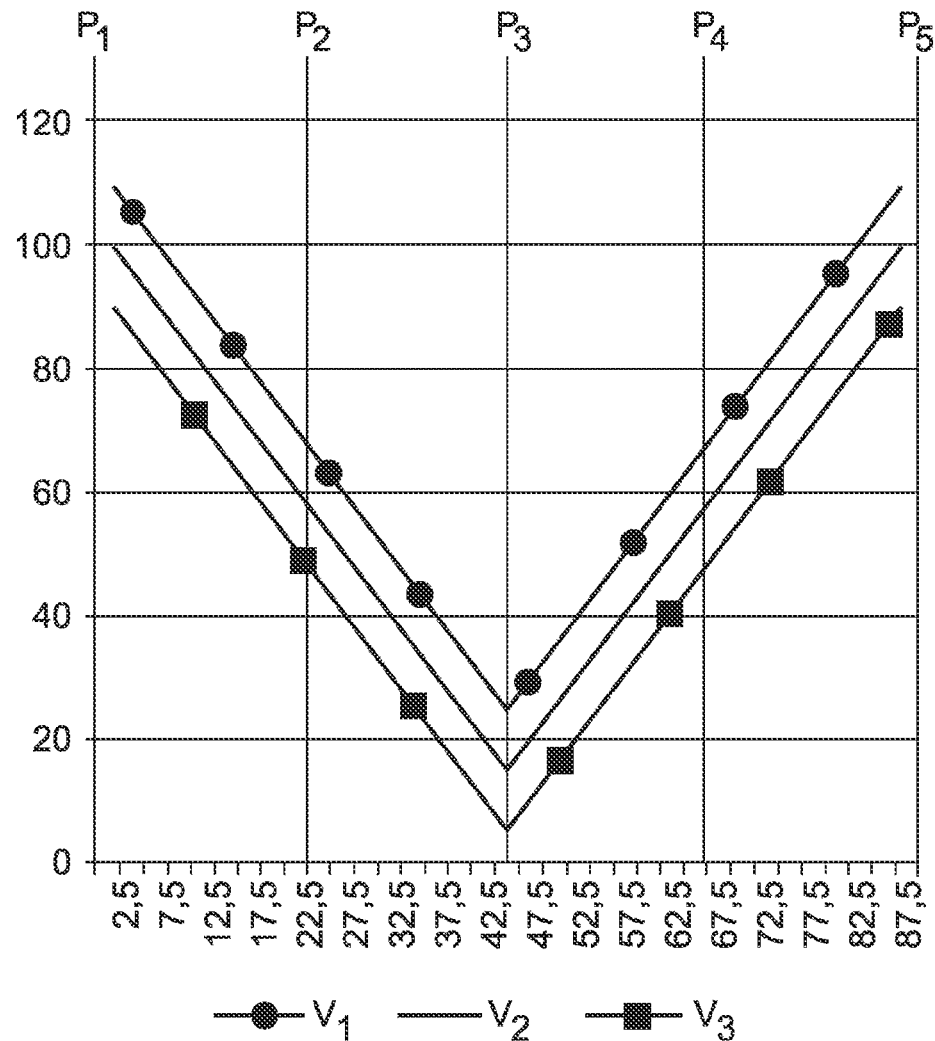
FIG. 3 is a graph depicting characteristic curves for the angular speed for various oscillating frequencies of the dosing apparatus pursuant to FIG. 1.
Figure 4:
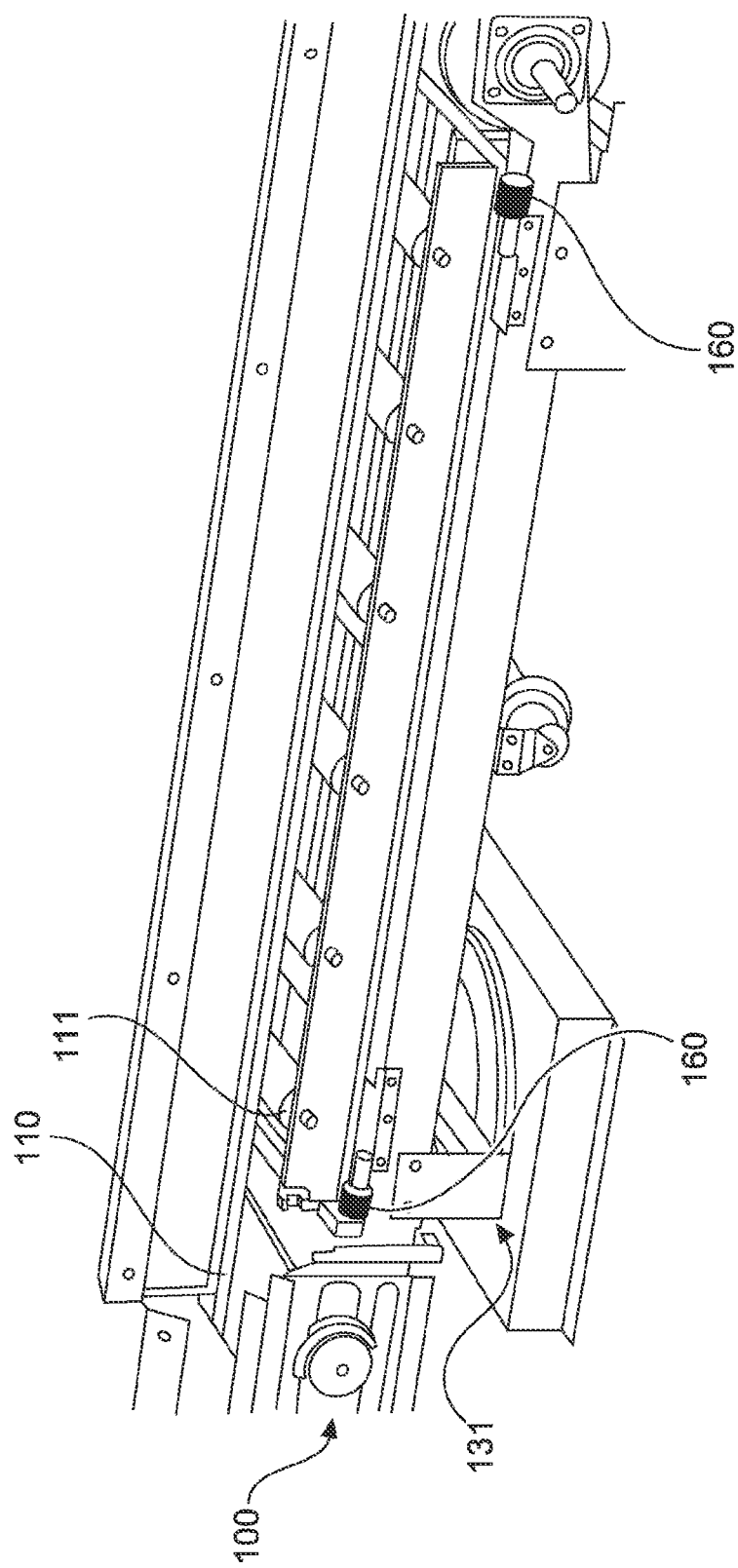
FIG. 4 is a three-dimensional view of an enlarged section of the dosing apparatus pursuant to FIG. 1.

Here, the control unit is designed, in particular, such as to control the speed, in particular the angular speed, of the oscillating movements of the conveyor 100 such that the speed, in particular, the angular speed, of the oscillating movement of the conveyor 100 is greater in the area of the reversal points P1 and P5, in particular, greater by a multiple, than between the reversal points P1 and P5, in particular, at a point P3 half way of the path of motion between the reversal points P1 and P5, as can be seen, in particular, in FIGS. 2 and 3. Preferably, the speeds, in particular, angular speeds, preferred for certain points of the path of motion, such as for the points P1-P5 shown in FIGS. 2 and 3, are determined empirically and provided in the control unit. The control unit can then, for example by means of interpolation, determine the speed for the remaining path of motion based on the speeds, in particular the angular speeds, provided for such certain points or areas to preferably generate a speed profile for the entire path of motion.

In FIG. 3, the angular speed is indicated as a percentage on the vertical axis while the angle is indicated in degrees on the horizontal axis. V1, V2 and V3 in FIG. 2 show the speed profiles over the path of motion of the circular arc section over 90 degrees for various oscillating frequencies, namely speed curve V1 for oscillating speed 70 Hz, speed curve V2 for oscillating speed 50 Hz and speed curve V3 for oscillating frequency 30 Hz.

When the direction changes, the angular speed of the conveyor will briefly drop to zero at reversal points P1 and P5 (not shown in FIG. 3). Deceleration of the conveyor and/or reversal of the direction of oscillating movement can be effected, for example, by a mechanical stop at the reversal points. The dosing apparatus 1 may, for example, show a sensor such as a roller sensor or roller lever on each side in the area of the discharge end 101, which will detect that the reversal point has been reached and which is preferably designed to then change the drive direction of the drive 133 of the conveyor 100 to achieve the oscillating movement, for example, via a reversing contactor control.

Here in FIG. 3, the angular speed in percent in the area of the reversal points is understood to mean, in particular, the angular speed which the conveyor has in its oscillating movement shortly before deceleration (value shortly before the reversal point P5 in FIG. 3) and after (re-)acceleration following the change in direction shortly after the reversal point (value shortly after the reversal point P1 in FIG. 3).

However, controlling can be preferably also performed by providing target (angular) speeds at the reversal points, which the control unit will then use as target (angular) speeds in the area of the reversal points, i.e., shortly before deceleration and after (re)acceleration following the change in direction.

For example, if the oscillating frequency is to be changed due to the weight present on the dosing apparatus 1, the speed curve may be adjusted accordingly, for example, by providing the default speeds at the points P1-P5 with a specific offset and by having the control unit calculate a new speed curve based on such changed default values.

This way, one can achieve a particularly precise dosing with a particularly even distribution of the good to be dried on the downstream units.

Furthermore, the dosing apparatus 1 has a control flap 150 with a control flap wall 151 that is attached to the two side walls 140 at its upper end 1510 and whose lower end 151u shows a spacing from the upper run 110 of the conveying direction 100 and thus defines a discharge opening through which good G can be discharged by the conveyor 100.

The control flap wall 151 is tilted to the horizontal between the upper end 1510 and the lower end 151u in the conveying direction R. The control flap 150 is pivotable about a horizontal adjusting axis at the upper end 1510, which also allows for changing the spacing of the lower end 151u of the control flap 150 from the upper run 110 of the conveyor 100. The handling and fixing section 152 of the control flap 150 serves, inter alia, to move the control flap 150 and, in particular, the control flap wall 151 in different swivel positions and fix them there.

As can be seen in FIG. 10, in particular, the control flap 150 and, in particular, the tilt of the control flap wall 151 to the horizontal in the conveying direction R has a positive impact on the flow of the good that is shown in FIG. 10. The good G is fed onto the conveyor 100 by a feeding system 200 where it initially moves substantially along the conveying direction R to the discharge end 101, as shown by the arrows marked with 1.

The control flap 150 applies pressure on the good G, as shown by the arrow marked with 2 in FIG. 10. Excess good G that cannot be discharged at the discharge end 101 is returned to the conveying process thanks to the tilted control flap 150 and is picked up by new good G in the direction of the discharge opening 101, as shown by the arrows marked with 3 in FIG. 10. This facilitates a continuous flow of good in the dosing apparatus.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and method without departing from the concepts of the present invention, and further it is to be understood that such concepts are intended to be covered by the following claims unless these claims by their language expressly state otherwise.

REFERENCE NUMBERS

1 Dosing apparatus
100 Conveyor
101 Discharge end
110 Upper run
111 Rolls
120 Deflection sheave
131 Mounting device
132 Roll
133 Drive/electric motor
140 Side wall
150 Control flap
151 Control flap wall
1510 Upper end of control flap
151u Lower end of control flap
152 Handling and fixing section
160 Load cell
200 Feeding system
G Good
I Course of side walls w/o opening in conveying direction
P1, P2, P3, P4, P5 Reversal point
R Conveying direction
V1, V2, V3 Speed profile
X Swivel axis
Y Longitudinal axis

The invention claimed is:

1. A dosing apparatus for dosing a good, in particular a good to be dried such as a fermentation substrate or dung, comprising:

a conveyor for conveying the good to be dried in a conveying direction, wherein the good to be dried may be fed onto the conveyor by a feeding system and wherein the conveyor may deliver the good to be dried to a downstream unit such as a drying apparatus, and a control unit designed to control a conveying speed of the conveyor, wherein the conveyor is pivotally arranged about a vertical swivel axis, and wherein the control unit is arranged and designed to control an angular speed or a frequency of a side-to-side oscillating movement of the conveyor about the swivel axis.

2. The dosing apparatus in accordance with claim 1, wherein the control unit is designed to control the angular speed or the frequency of the oscillating movement of the conveyor about the swivel axis based on the conveying speed.

3. The dosing apparatus in accordance with claim 2, wherein the control unit is designed to change the angular speed of the oscillating movement of the conveyor about the swivel axis along a path of motion of the conveyor.

4. The dosing apparatus in accordance with claim 1, wherein the control unit is designed to control the conveying speed of the conveyor based on the angular speed or the frequency of the oscillating movement of the conveyor about the swivel axis.

5. The dosing apparatus in accordance with claim 1, wherein the control unit is designed to control the conveying speed of the conveyor based on the conveying speed of the conveyor along a path of motion to the conveyor.

6. The dosing apparatus in accordance with claim 1, wherein the control unit is designed to control the angular speed of the oscillating movement of the conveyor such that the angular speed of the oscillating movement of the conveyor is greater in the area of a pair of reversal points of a path of motion of the oscillating movement than between the reversal points at one point halfway of the path of motion between the reversal points.

7. The dosing apparatus in accordance with claim 1, wherein the control unit is designed to determine the speed of the oscillating movement of the conveyor for the remaining path of motion based on a set of speeds that have been indicated for specific points of the path of motion.

8. The dosing apparatus in accordance with claim 1, wherein the dosing apparatus comprises a weighing apparatus arranged and designed to determine the weight of the good to be dried that is located on the conveyor.

9. The dosing apparatus in accordance with claim 1, wherein the conveyor has a plurality of load cells.

10. The dosing apparatus in accordance with claim 1, wherein the conveyor has four load cells, wherein preferably two load cells each are arranged crosswise to the conveying direction spaced apart at a first and at a second end of the conveyor.

11. The dosing apparatus in accordance with claim 1, wherein the control unit is designed to control the angular speed or the frequency of the oscillating movement of the conveyor about the swivel axis based on the weight of the good that is to be dried and that is located on the conveyor.

12. The dosing apparatus in accordance with claim 1, wherein the control unit is designed to provide default speeds with a weight-dependent offset based on the weight of the good that is to be dried and that is located on the conveyor and to consider such offset when determining the speed of the oscillating movement of the conveyor for the remaining path of motion.

13. The dosing apparatus in accordance with claim 1, wherein the control unit is arranged and designed to receive one or more signals and to control the conveying speed of the conveyor about the swivel axis based on the signal or signals received.

14. The dosing apparatus in accordance with claim 13, wherein the signal comprises information on one or more downstream units such as on their conveying speed(s).

15. The dosing apparatus in accordance with claim 1, wherein the dosing apparatus has two side walls that substantially extend parallel to the conveying direction and that are substantially aligned vertically, at least in sections, or that are tilted by less than 30 degrees to the vertical.

16. The dosing apparatus in accordance with claim 1, wherein the dosing apparatus has two side walls that substantially extend parallel to the conveying direction and that are substantially aligned vertically, at least in sections, or that are tilted by less than 10 degrees to the vertical.

17. The dosing apparatus in accordance with claim 1, wherein the dosing apparatus has two side walls extending substantially parallel to the conveying direction each open by less than 5 degrees in the conveying direction.

18. The dosing apparatus in accordance with claim 1, wherein the dosing apparatus has two side walls extending substantially parallel to the conveying direction each open by less than 1 degree each in the conveying direction.

19. The dosing apparatus in accordance with claim 1, wherein the dosing apparatus has a control flap arranged substantially crosswise to the conveying direction.

20. The dosing apparatus in accordance with claim 19, wherein the control flap is affixed to the two side walls.

21. The dosing apparatus in accordance with claim 19, wherein the control flap is pivotable about a horizontal adjusting axis and fixable in various swivel positions.

22. The dosing apparatus in accordance with claim 1, wherein the adjusting axis is arranged such that a lower end of the control flap is pivotable about the adjusting axis so that the adjusting axis can assume one or more swivel positions in which the control flap is tilted from an upper end to a lower end in the conveying direction.

23. The dosing apparatus in accordance with claim 1, wherein the control flap is designed and arranged such that a minimum distance between the control flap and the conveyor is not undercut or a maximum distance between the control flap and the conveyor is not exceeded.

24. A method for dosing a good, in particular, a good to be dried such as a fermentation substrate or dung, comprising:
conveying a good to be dried, which has been fed onto a conveyor, in a conveying direction;
controlling a conveying speed of the conveyor; and
controlling an angular speed or an oscillating frequency of an oscillating movement of the conveyor about a vertical swivel axis of the conveyor.

25. A dosing apparatus for dosing a good, in particular a good to be dried such as a fermentation substrate or dung, comprising:
a conveyor for conveying the good to be dried in a conveying direction, wherein the good to be dried may be fed onto the conveyor by a feeding system and wherein the conveyor may deliver the good to be dried to a downstream unit such as a drying apparatus, and
a control unit designed to control a conveying speed of the conveyor, wherein the conveyor is pivotally arranged about a vertical swivel axis, and wherein the control unit is arranged and designed to control an angular speed or a frequency of an oscillating movement of the conveyor about the swivel axis.

\* \* \* \* \*